(12) United States Patent
Hogger et al.

(10) Patent No.: US 11,117,622 B2
(45) Date of Patent: Sep. 14, 2021

(54) BOW OF A MOTOR VEHICLE AND METHOD OF FORMING SAME

(71) Applicant: Bayerische Motoren Werke Aktiengesellschaft, Munich (DE)

(72) Inventors: Thomas Hogger, Otterfing (DE); Constantin Schneider, Cologne (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 151 days.

(21) Appl. No.: 16/409,925

(22) Filed: May 13, 2019

(65) Prior Publication Data

US 2019/0263452 A1  Aug. 29, 2019

Related U.S. Application Data

(63) Continuation of application No. PCT/EP2017/081155, filed on Dec. 1, 2017.

(30) Foreign Application Priority Data

Jan. 11, 2017  (DE) ..................... 10 2017 200 368.5

(51) Int. Cl.
*B62D 25/04* (2006.01)
*B62D 29/04* (2006.01)

(52) U.S. Cl.
CPC ............. *B62D 25/04* (2013.01); *B62D 29/04* (2013.01)

(58) Field of Classification Search
CPC ..................................................... B62D 25/04
USPC ..................................................... 296/193.06
See application file for complete search history.

(56) References Cited

U.S. PATENT DOCUMENTS

| 2,192,075 | A | * | 2/1940 | Gregoire | B62D 21/02 296/193.02 |
| 6,209,950 | B1 | * | 4/2001 | Hanyu | B62D 25/04 296/203.02 |
| 6,607,239 | B1 | * | 8/2003 | Fuji | B60R 22/24 296/203.03 |
| 7,204,545 | B2 | * | 4/2007 | Roux | B60R 21/34 296/187.04 |
| 8,047,603 | B2 | * | 11/2011 | Goral | B62D 29/005 296/187.03 |
| 8,530,015 | B2 | * | 9/2013 | Mendiboure | B62D 29/002 428/36.5 |

(Continued)

FOREIGN PATENT DOCUMENTS

| CN | 105579329 A | 5/2016 |
| DE | 10 2004 008 006 A1 | 9/2005 |

(Continued)

OTHER PUBLICATIONS

International Search Report (PCT/ISA/210) issued in PCT Application No. PCT/EP2017/081155 dated Feb. 13, 2018 with English translation (seven pages).

(Continued)

*Primary Examiner* — Jason S Morrow
(74) *Attorney, Agent, or Firm* — Crowell & Moring LLP

(57) ABSTRACT

A bow of a motor vehicle has a fiber-reinforced plastic upper band, a fiber-reinforced plastic lower band and an injection-molded rib structure connecting the plastic upper band and the plastic lower band. The injection-molded rib structure is injection-molded onto the plastic lower band and the plastic upper band.

18 Claims, 3 Drawing Sheets

(56) References Cited

U.S. PATENT DOCUMENTS

| | | | |
|---|---|---|---|
| 9,783,240 B2* | 10/2017 | Rocheblave | B62D 29/004 |
| 10,414,445 B2* | 9/2019 | Kellner | B60R 21/13 |
| 2002/0089215 A1* | 7/2002 | Frasher | B60R 21/04 |
| | | | 296/203.02 |
| 2009/0267386 A1* | 10/2009 | Persson | B62D 25/04 |
| | | | 296/205 |
| 2012/0280536 A1 | 11/2012 | Malek et al. | |
| 2015/0151796 A1* | 6/2015 | Berger | B62D 25/04 |
| | | | 296/193.06 |
| 2016/0152277 A1* | 6/2016 | Rocheblave | B62D 29/04 |
| | | | 296/193.06 |
| 2017/0113732 A1* | 4/2017 | Lee | B62D 29/005 |
| 2017/0173894 A1* | 6/2017 | Konrad | B29C 45/14467 |
| 2019/0070803 A1* | 3/2019 | Rocheblave | B29C 70/681 |

FOREIGN PATENT DOCUMENTS

| | | |
|---|---|---|
| DE | 10 2007 022 385 A1 | 11/2008 |
| DE | 10 2009 052 110 A1 | 5/2011 |
| DE | 10 2011 100 050 A1 | 10/2012 |
| KR | 10-2016-0041938 A | 4/2016 |
| WO | WO 2013/029695 A1 | 3/2013 |

OTHER PUBLICATIONS

German-language Written Opinion (PCT/ISA/237) issued in PCT Application No. PCT/EP2017/081155 dated Feb. 13, 2018 (five pages).

German-language Search Report issued in counterpart German Application No. 10 2017 200 368.5 dated Jul. 6, 2017 with partial English translation (10 pages).

Chinese-language Office Action issued in Chinese Application No. 201780062523.0 dated May 25, 2021 with English translation (13 pages).

* cited by examiner

BOW OF A MOTOR VEHICLE AND METHOD OF FORMING SAME

CROSS REFERENCE TO RELATED APPLICATIONS

This application is a continuation of PCT International Application No. PCT/EP2017/081155, filed Dec. 1, 2017, which claims priority under 35 U.S.C. § 119 from German Patent Application No. 10 2017 200 368.5, filed Jan. 11, 2017, the entire disclosures of which are herein expressly incorporated by reference.

BACKGROUND AND SUMMARY OF THE INVENTION

The invention relates to a bow for a motor vehicle.

Bows have been in use in automotive engineering for many years. Bows serve in particular as hollow members for reinforcing specific regions, for example vertical pillars (A-pillars, B-pillars, C-pillars) or roof constructions.

Known bows in automotive engineering fulfil their task but are comparatively expensive and have a high weight. For example, braided components, multi-shell liquid-resin molded parts, or three-dimensional members which are generated by the high-pressure tube hydro forming method are used.

The invention is therefore based on the need to provide a bow for a motor vehicle which has a high rigidity and is capable of being produced in a manner suitable for large volumes.

According to the invention, a bow of a motor vehicle comprises a fiber-reinforced plastics-material upper band, a fiber-reinforced plastics-material lower band, and an injection-molded rib structure that connects the plastics-material upper band and the plastics-material lower band. The bow according to the invention is, in particular, configured as a B-pillar bow. The injection-molded rib structure is injection-molded to the plastics-material lower band and the plastics-material upper band, and in a favorable variant of the embodiment, when viewed in the lateral cross section along the longitudinal direction of the bow, has reinforcement webs which run so as to be angled in relation to the plastics-material lower band and the plastics-material upper band. When viewed in this lateral cross section, in each case two neighboring angled reinforcement webs conjointly with the plastics-material lower band or the plastics-material upper band form one local reinforcement unit which is in each case configured as a triangle. The reinforcement webs directly connect the plastics-material lower band and the plastics-material upper band.

A bow of this type corresponds to a CFRP component (CFRP=carbon fiber reinforced plastics), in which the upper and lower bands from fiber-reinforced plastics material, preferably having carbon fibers that have a thermoplastic matrix, are connected to the injection-molded rib structure in the injection-molding tool. The injection-molded rib structure in one preferred embodiment is formed from a thermoplastics material.

The plastics-material upper band and the plastics-material lower band in one variant of the embodiment are formed from continuous material and, depending on the desired extent in the longitudinal direction, are cut to the predetermined length of the bow. CFRP is in particular used as a material.

In one embodiment of the invention, it is provided that the reinforcement webs of the injection-molded rib structure extend across an entire width in the transverse direction of the bow. Moreover, the plastics-material upper band and the plastics-material lower band extend across the entire width of the injection-molded rib structure. A direction perpendicular to the longitudinal direction and perpendicular to the thickness direction is defined as the width herein.

In one variant of the embodiment, it is furthermore provided that in each case two neighboring reinforcement webs run so as to be mutually angled and are connected at a connection point on the plastics-material lower band or the plastics-material upper band. The reinforcement webs at the connection point herein are injection-molded to the plastics-material lower band or the plastics-material upper band. The reinforcement webs, by way of the connection point, are connected not only to the plastics-material lower band or the plastics-material upper band, but also to one another and enable a truss-like distribution of force, wherein the connection point acts as a node. The reinforcement webs preferably run at an angle of 30 to 60°, furthermore preferably at an angle of 40 to 50°, in relation to a perpendicular connection between the plastics-material upper band and the plastics-material lower band.

In one favorable embodiment of the bow, when viewed across the longitudinal direction of the bow, a multiplicity of reinforcement units are repeatedly provided. Each individual reinforcement web of the respective reinforcement unit herein extends across the entire width of the bow. Moreover, the two angled reinforcement webs that in each case mutually converge are fastened to the plastics-material upper band or the plastics-material lower band at a connection point.

In terms of production technology it is furthermore favorable that the multiplicity of reinforcement units, when viewed in the longitudinal direction, are in each case disposed so as to be mutually spaced apart. This means that the reinforcement webs, when viewed in the longitudinal direction, are not continuous, but a spacing is provided after, in each case, two mutually angled reinforcement webs. In order to be able to incorporate the injection-molded rib structure between the fiber-reinforced plastics-material lower band and the fiber-reinforced plastics-material upper band by the injection-molding method, the plastics-material lower band and the plastics-material upper band are placed into an injection tool having a tool upper part and a tool lower part. The tool upper part and the tool lower part comprise in each case engagement means for engaging between the plastics-material lower band and the plastics-material upper band from the side. The engagement means have a complementary shape having a mutual pre-determined offset as injection clearances, wherein the plastics material is injected into the injection clearances. The engagement means can then be laterally extracted again from the region between the plastics-material lower band and the plastics-material upper band.

In order for a uniform rigidity to be guaranteed across the length of the bow in the longitudinal direction, an embodiment in which the reinforcement units are of identical configuration is advantageous.

In order for the bow to be linked to contiguous motor-vehicle parts, said bow at the respective longitudinal ends thereof comprises fastening elements which in the longitudinal direction in portions enclose the plastics-material lower band and the plastics-material upper band, or are linked in a form-fitting manner, for example by way of fastening webs, to said plastics-material lower band and said plastics-material upper band, and are capable of being fastened thereto, respectively. The fastening elements in one exemplary embodiment are configured as finisher sleeves or peripheral sleeves which are, for example, adhesively bonded to the plastics-material lower band and the plastics-material upper band. In one alternative embodiment, a perforated deep-drawn element, preferably a perforated deep-drawn sheet-metal panel, which, over-molded with plastics material, establishes the form fit to the bow, can be used.

Other objects, advantages and novel features of the present invention will become apparent from the following detailed description of one or more preferred embodiments when considered in conjunction with the accompanying drawings.

DETAILED DESCRIPTION OF THE DRAWINGS

The figures are schematic in an exemplary manner. In all views, the same reference signs refer to identical parts.

Figure 1:
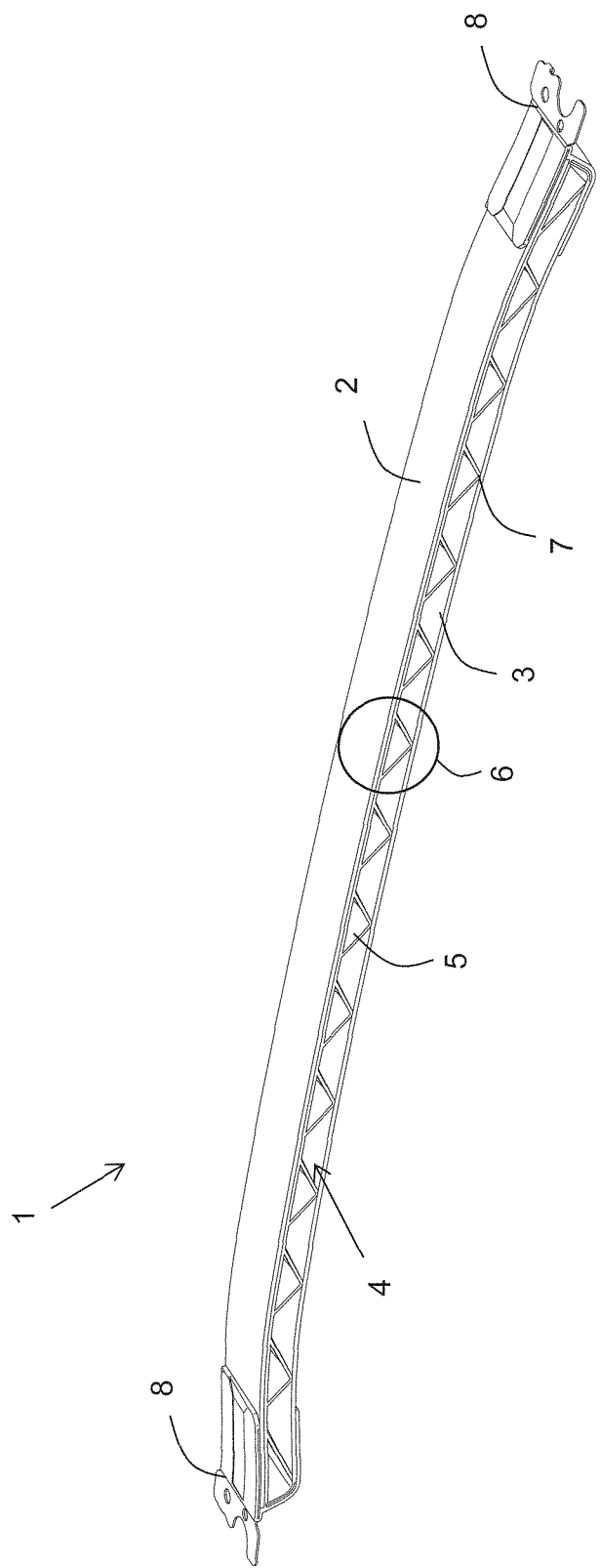
FIG. 1 is a perspective view of a B-pillar bow.

A bow 1, configured as a B-pillar bow, of a motor vehicle is illustrated in a perspective view in FIG. 1. The bow 1 is in multiple parts and is formed from a fiber-reinforced plastics-material upper band 2, a fiber-reinforced plastics-material lower band 3, and an injection-molded rib structure 4 by way of which the plastics-material upper band 2 and the plastics-material lower band 3 are directly connected. Perforated deep-drawn sheet-metal panels 8, which are configured as fastening elements and engage across the plastics-material upper band 2 and the plastics-material lower band 3, are fastened to the external peripheries of the bow 1. When viewed in the longitudinal direction, the webs of said deep-drawn sheet-metal panels 8 engage in a form-fitting manner across the upper and lower side of the plastics-material upper band 2 and the plastics-material lower band 3, wherein the lateral regions however remain open. The bow 1 is capable of being assembled in the vehicle by way of the peripheral sleeves 8. Other components are moreover capable of being fastened to the bow 1.

Figure 3:
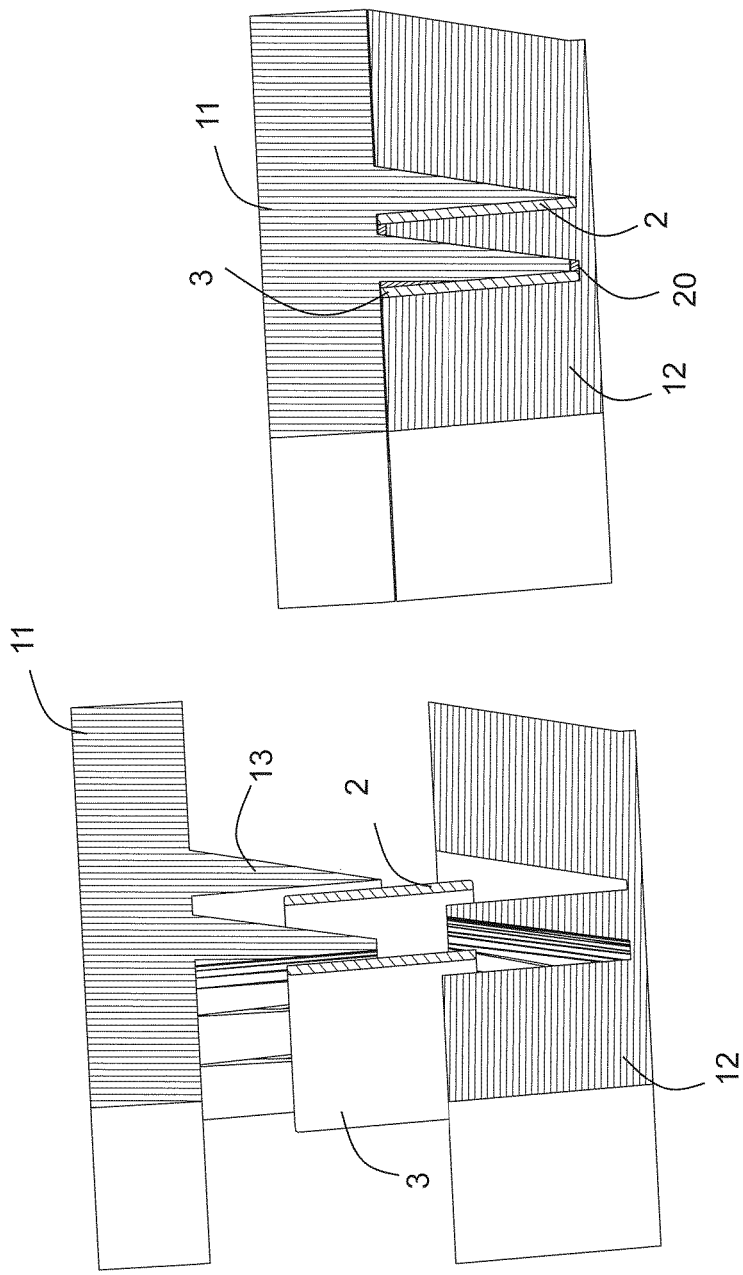
FIG. 3 shows a tool for producing the B-pillar bow as per FIG. 1 or FIG. 2.

The injection-molded rib structure 4, by way of a tool that is schematically illustrated in FIG. 3, is injection-molded to the plastics-material upper band 2 and the plastics-material lower band 3. When viewed in the longitudinal direction, the rib structure 4 has a repeated roof structure which is formed by reinforcement webs 5 and which, when viewed in the lateral cross section, is formed by the reinforcement webs 5 which run so as to be angled in relation to the plastics-material lower band 3 and the plastics-material upper band 2. In each case, two neighboring reinforcement webs 5 meet one another at the connection point 7 on the plastics-material lower band 3, said neighboring reinforcement webs 5 being connected to one another and injection-molded to the plastics-material lower band 3 at said connection point 7. In a lateral view, in each case two connected reinforcement webs 5 conjointly with the plastics-material upper band 2 form one local reinforcement unit 6 which is in each case configured as a triangle.

Figure 2:
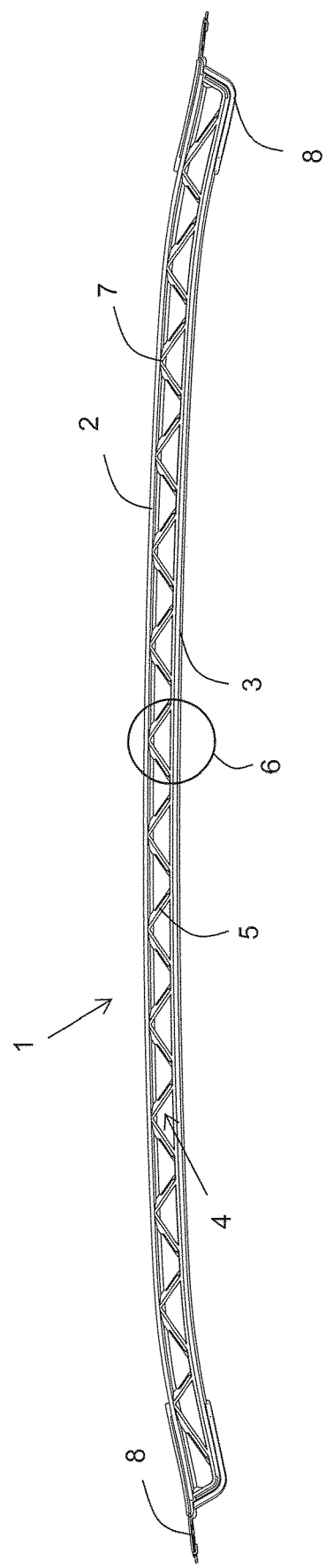
FIG. 2 is a side view of a B-pillar bow.

The embodiment according to FIG. 2 is identical to that of FIG. 1 with the exception that in each case the two connected reinforcement webs 5 conjointly with the plastics-material lower band 3 form the local reinforcement unit 6 which is in each case configured as a triangle. A plurality of identically configured and mutually spaced-apart reinforcement units 6 are repeatedly provided when viewed across the longitudinal direction of the bow 1 in both embodiments. It can moreover be readily seen in FIG. 2 that the bow 1 across the extent thereof in the longitudinal direction is curved, wherein the curvature in each case increases toward the external peripheral portions.

The reinforcement webs 5 are in each case plate-shaped and extend symmetrically from the plastics-material upper band 2 to the plastics-material lower band 3 at an angle of 50° in relation to a perpendicular connection between the plastics-material upper band 2 and the plastics-material lower band 3. The injection-molded rib structure 4 formed by the reinforcement webs 5 extends across the entire width in the transverse direction of the bow 1 and on the upper side and the lower side is covered in a completely planar manner by the plastics-material upper band 2 and the plastics-material lower band 3. The external faces of the plastics-material upper band 2 and of the plastics-material lower band 3 are flat and smooth.

A tool for injection-molding the injection-molded rib structure 4 to the plastics-material upper band 2 and the plastics-material lower band 3 is schematically illustrated in FIG. 3. The tool comprises a tool upper part 11 and a tool lower part 12 which have in each case lateral engagement structures 13. The structures 13 engage laterally in the intermediate space between the plastics-material upper and the plastics-material lower band 2, 3, said bands 2, 3 being placed into the tool, and said engagement structures 13 conjointly provide injection clearances into which the thermoplastic plastics material 20 is then injected so as to form the injection-molded rib structure 4. The engagement structures 13 are subsequently extracted again laterally from the region between the plastics-material lower band 3 and the plastics-material upper band 2, and the bow 1 is retrieved from the tool.

The invention in terms of the embodiment thereof is not limited to the above-stated preferred exemplary embodiments. Rather, a number of variants are contemplated which make use of the presented solution even for fundamentally different embodiments. For example, alternative connectors, in particular screw-fittable flanges, are also attachable to the bow 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A bow for a motor vehicle, comprising:
a fiber-reinforced plastics-material upper band;
a fiber-reinforced plastics-material lower band;
an injection-molded rib structure that connects the plastics-material upper band and the plastics-material lower band, wherein
the injection-molded rib structure is injection-molded to the plastics-material lower band and the plastics-material upper band; and
fastening elements of sheet steel at respective longitudinal ends of the bow, which fastening elements by injection-molding method are linked in a form-fitting manner to the plastics-material lower band and the plastics-material upper band.

2. The bow as claimed in claim 1, wherein
the injection-molded rib structure, when viewed in lateral cross section, has reinforcement webs which run so as to be angled in relation to the plastics-material lower band and the plastics-material upper band, and
when viewed in the lateral cross section, in each case two neighboring angled reinforcement webs conjointly with the plastics-material lower band or the plastics-material upper band form one local reinforcement unit which is in each case configured as a triangle.

3. The bow as claimed in claim 1, wherein
the reinforcement webs of the injection-molded rib structure extend across an entire width in the transverse direction of the bow.

4. The bow as claimed in claim 2, wherein
in each case two neighboring reinforcement webs run so as to be mutually angled and are connected at a connection point on the plastics-material lower band or the plastics-material upper band, and
the reinforcement webs at the connection point are injection-molded to the plastics-material lower band or the plastics-material upper band.

5. The bow as claimed in claim 2, wherein
when viewed across the longitudinal direction of the bow, a plurality of reinforcement units are repeatedly provided.

6. The bow as claimed in claim 5, wherein
the plurality of reinforcement units, when viewed in the longitudinal direction, are in each case disposed so as to be mutually spaced apart.

7. The bow as claimed in claim 4, wherein
the reinforcement units are of identical configuration.

8. The bow as claimed in claim 5, wherein
the reinforcement units are of identical configuration.

9. The bow as claimed in claim 2, wherein
the reinforcement webs run at an angle of 30 to 60° in relation to a perpendicular connection between the plastics-material upper band and the plastics-material lower band.

10. The bow as claimed in claim 1, wherein
the bow is configured as a B-pillar bow.

11. A method of forming a bow for a motor vehicle, the method comprising the acts of:
providing a fiber-reinforced plastics-material upper band and a fiber-reinforced plastic-material lower band;
injection-molding a rib structure to the plastics-material upper band and the plastics-material lower band in order to connect the plastics-material upper band and the plastics-material lower band; and
providing fastening elements of sheet steel at respective longitudinal ends of the bow, which fastening elements by injection-molding method are linked in a form-fitting manner to the plastics-material lower band and the plastics-material upper band.

12. The method as claimed in claim 11, wherein
the injection-molded rib structure, when viewed in lateral cross section, has reinforcement webs which run so as to be angled in relation to the plastics-material lower band and the plastics-material upper band, and
when viewed in the lateral cross section, in each case two neighboring angled reinforcement webs conjointly with the plastics-material lower band or the plastics-material upper band form one local reinforcement unit which is in each case configured as a triangle.

13. The method as claimed in claim 11, wherein
the reinforcement webs of the injection-molded rib structure extend across an entire width in the transverse direction of the bow.

14. The method as claimed in claim 12, wherein
in each case two neighboring reinforcement webs run so as to be mutually angled and are connected at a connection point on the plastics-material lower band or the plastics-material upper band, and
the reinforcement webs at the connection point are injection-molded to the plastics-material lower band or the plastics-material upper band.

15. The method as claimed in claim 12, wherein
when viewed across the longitudinal direction of the bow, a plurality of reinforcement units are repeatedly provided.

16. The method as claimed in claim 15, wherein
the plurality of reinforcement units, when viewed in the longitudinal direction, are in each case disposed so as to be mutually spaced apart.

17. The method as claimed in claim 14, wherein
the reinforcement units are of identical configuration.

18. The method as claimed in claim 12, wherein
the reinforcement webs run at an angle of 30 to 60° in relation to a perpendicular connection between the plastics-material upper band and the plastics-material lower band.

* * * * *